United States Patent [19]

Bosier et al.

[11] Patent Number: 5,012,368
[45] Date of Patent: Apr. 30, 1991

[54] MAGNETIC HEAD/SUPPORT ASSEMBLY AND ACCESS MECHANISM FOR A DISK FILE

[75] Inventors: Maurice H. Bosier, Chandlers Ford; Gerald Dixon, Winchester, both of England

[73] Assignee: International Business Machines Corporation, Armonk, N.Y.

[21] Appl. No.: 340,104

[22] Filed: Apr. 18, 1989

[30] Foreign Application Priority Data

Apr. 29, 1988 [EP] European Pat. Off. ........ 88303926.5

[51] Int. Cl.⁵ .............................................. G11B 21/16
[52] U.S. Cl. .................. 360/104; 360/98.01
[58] Field of Search ................................. 360/103–104, 360/106, 98.01

[56] References Cited

U.S. PATENT DOCUMENTS

| 4,402,025 | 8/1983 | Anderson et al. | 360/104 X |
| 4,443,824 | 4/1984 | Frater et al. | 360/104 |
| 4,814,906 | 3/1989 | Suzuki et al. | 360/104 X |
| 4,853,811 | 8/1989 | Brooks et al. | 360/103 |
| 4,875,117 | 10/1989 | Slezak et al. | 360/98.01 |

FOREIGN PATENT DOCUMENTS

| 59-168968 | 9/1984 | Japan | 360/104 |
| 61-17264 | 1/1986 | Japan | 360/104 |
| 61-287082 | 12/1986 | Japan | 360/104 |

*Primary Examiner*—John H. Wolff
*Attorney, Agent, or Firm*—Robert W. Lahtinen; Richard E. Billion

[57] ABSTRACT

A magnetic head/support assembly 10 for assembly into the data access mechanism 70 of a magnetic disk file comprises a magnetic head element 12 and a support structure 11, 20, 21 for the head element. The head/support assembly also comprises a head lead locator 27 including a frame 51 for locating and terminating the leads 15 from the head element 12 remotely from the element. The locator is attached to the support structure and the leads extend across the frame and are retained in fixed spaced apart relationship over a sufficient portion of their lengths to permit direct electrical connection to a correspondingly spaced pattern of conductors on external data channel circuitry carried by the access mechanism.

15 Claims, 4 Drawing Sheets

FIG. 6
FIG. 7
FIG. 8
FIG. 9
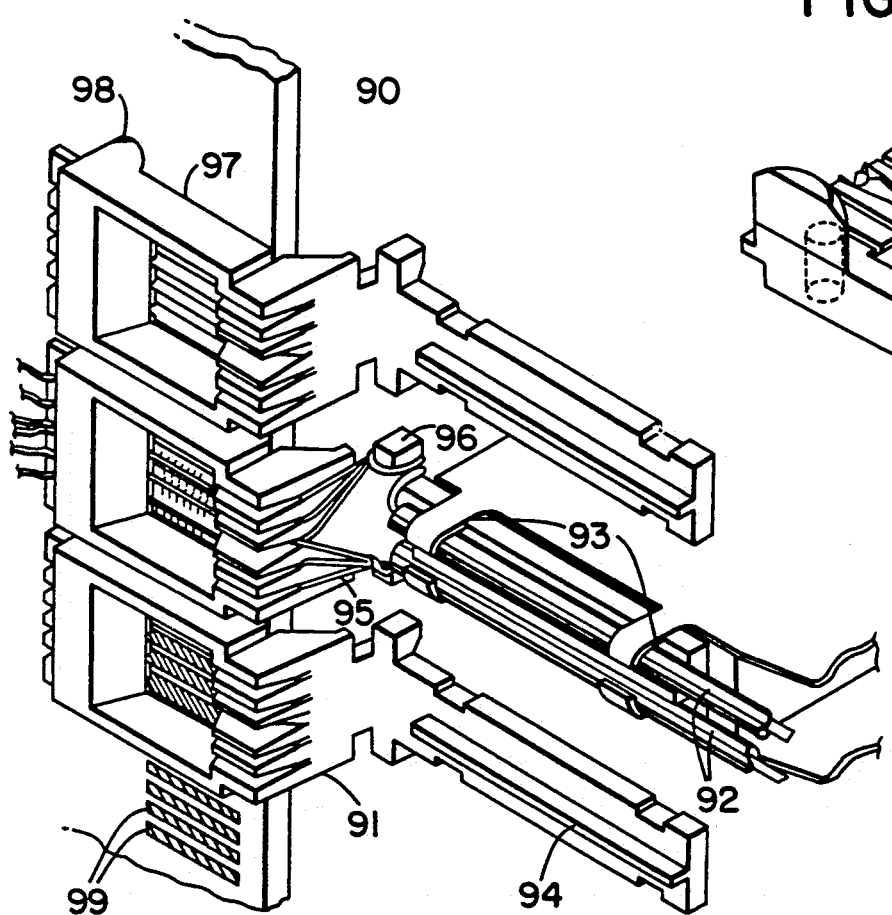
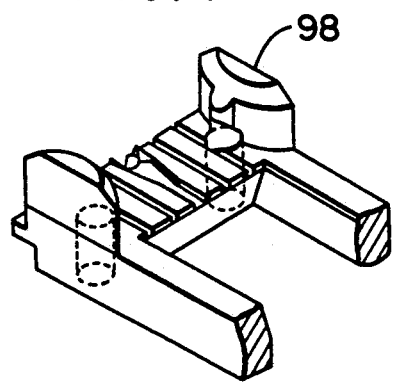
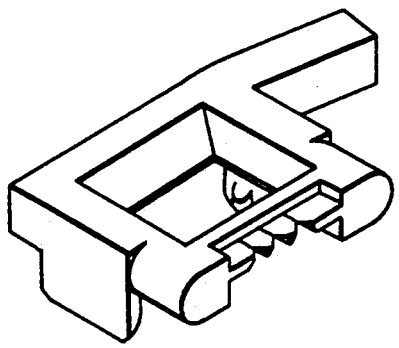
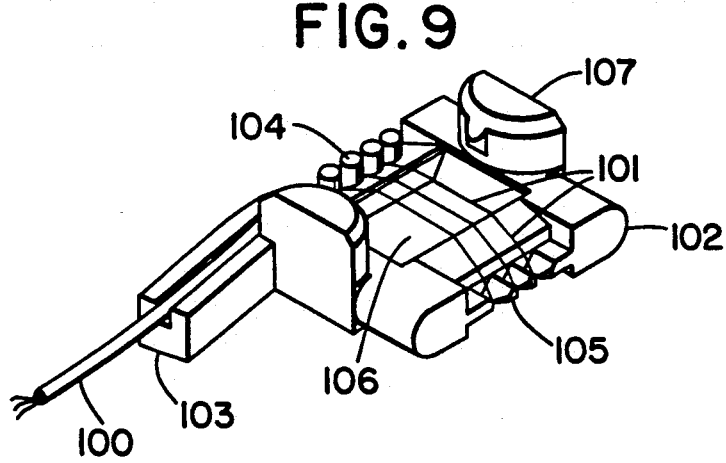

MAGNETIC HEAD/SUPPORT ASSEMBLY AND ACCESS MECHANISM FOR A DISK FILE

FIELD OF THE INVENTION

The present invention relates to a magnetic head/support assembly suitable for use in a magnetic disk file and to a data access mechanism incorporating such an assembly.

BACKGROUND OF THE INVENTION

Magnetic heads for disk files are currently supplied in the form of a slider, carrying a transducer element, which is mounted on a suspension flexure. The flexure is provided with locating features for location on a support arm which extends from an access mechanism for positioning the heads. Fine wires (leads) for carrying signals to and from the head are led out from the transducing element along the flexure to the access mechanism through tubes which are retained on the flexure. Heads are generally provided to the disk file manufacturing line as head/support assemblies which include the flexure, slider and leads.

On assembly to a rigid support arm or upon the subsequent mounting of the arm on the access mechanism, each set of leads from multiple heads must be connected to the data channel circuitry of the disk file. This circuitry may be partly on the arm, the access mechanism or fixed elsewhere in the disk file. Intermediate flexible tape cable connections are employed both on the arm itself and between the access mechanism and fixed portions of the file.

Connections of a large number of heads to such intermediate flexible tape cable is very labor intensive as each individual head lead must be placed over and soldered to a corresponding conductor or terminal pad.

An article by J. P. G. Dunman et al (IBM Technical Disclosure Bulletin Vol. 20, No. 5, October 1977, P 1984) entitled "Actuator Assembly For A Disk File", shows such connections for a rotary actuator having a rigid arm with compliant head suspensions mounted on the arm in which the signal processing electronics are mounted on a rigid printed circuit board (PCB) mounted statically alongside the actuator. Connection to the PCB is via a flexible tape cable having one end connected both electrically and mechanically to the PCB end and the other mounted on the arm, with a free portion of flexible cable in between to facilitate actuator movement. Connection of the head leads to the flexible cable at the arm end is achieved by soldering of the free ends of the leads to exposed contact pads on the end of the flexible cable mounted on the arm.

A further example of head lead connection to a circuit is given in an article by J. T. Young (IBM Technical Disclosure Bulletin Vol. 20, No. 12, May 1978, P 5350), entitled "Tape Cable Clip". This shows another arrangement with head leads connected to conductors in a tape cable. It includes a clip, whose primary function is to retain the tape cable to the arm. As a secondary function, the clip also retains the free ends of the head leads against the arm and provides strain relief for them. It achieves this secondary function through a sprung member with channels which cover and clamp the head leads to the arm at a point some distance from the point of connection to the tape cable. No details are given of the method of attaching the head leads to the tape cable but, in the IBM 3310 Disk Storage Facility, which employs the described arrangement, the free ends of the head leads are manually bent and positioned to lie over contact pads on the tape cable, whereupon solder is applied to bond the lead ends to the tape cable. Thus the clip provides limited retention of the leads to assist manual soldering but does not avoid the manipulation of individual leads.

In an article entitled "Magnetic Wire Preparation For Automatic Wire Bond" by A. Ilgovsky and A. A. Mirza (IBM Technical Disclosure Bulletin Vol. 26, No. 11, April 1984, P 5989), a head support assembly is shown in which the ends of the head leads are not left free but are soldered to a small terminal board. Although this board facilitates connection of the head/support assembly to external circuitry in that it is sturdier and more stable than the free head leads, it does introduce an additional connector and multiplies the number of electrical termination operations needed with a consequently greater chance of failure of the component.

Finally, to complete the review of the known prior art, it is well known to connect integrated circuit chips to external circuitry by means of so called "leadframes". These are patterns of metal fingers which locate on respective pins of the chip. A lead frame which is itself encapsulated in a plastic material support shell is shown in an article by W. R. De Boskey entitled "Directly Attached Integrated Circuit Lead Frame" (IBM Technical Disclosure Bulletin Vol. 15, No. 1, June 1972, P 307).

SUMMARY OF THE INVENTION

The prior art, therefore, does not provide a head/support assembly whose head leads can be readily directly connected to external circuitry in an automated or semi-automated manner.

Accordingly, the present invention provides a magnetic head/support assembly comprising at least one magnetic head element for reading information from and/or writing information on a magnetic record disk of a magnetic disk file, a support structure mountable in such a disk file for supporting the magnetic head element in transducing relationship with the magnetic record disk, a plurality of electrical conductor leads for carrying information signals to or from the head element and head lead locating means fro locating the head leads remotely from the head element and at which the head leads are terminated for electrical connection to external circuitry, characterized in that the head lead locating means includes a frame, attached to the support structure, across which the leads extend and are retained in fixed spaced apart relationship over a sufficient portion of their lengths to permit direct electrical connection of said portion to a correspondingly spaced pattern of conductors on such external circuitry.

Unlike the prior art schemes, the head leads are prepositioned in correspondence with a conductor pattern on external circuitry in such a manner that direct connection can be made. While it is conceivable that the locating means could be a removable item, it is preferred that the location means remains part of the assembled disk file access mechanism since it provides greater structural protection for the head leads and since the act of removing it could itself lead to damage.

Although the frame could be a closed frame with a back, it is preferred that the frame is apertured to expose each connection portion of the leads from two opposed directions. This facilitates a wider range of connection methods, particularly those involving a probe. Preferably, also, the frame is rectangular with a single aperture for the same reason although multi-apertured frames could be used.

Preferably, the frame also employs guide slots for respective leads although positioning and retention by the use of adhesives without guidance features would be possible.

Where guide slots are used on opposite edges of the frame, one set can advantageously be made narrow enough to trap and retain the loose ends of the head leads. The other set, preferably, functions only to guide the leads, with strain relief and tensioning being effected by wiring the leads around a strain relief post.

In the preferred form of the invention, the support structure for the head element comprises a relatively rigid member, such as an arm, a flexure and a slider mounted on the flexure at an end remote from the member. The head locating means comprises a mounting portion connected to the frame by a hinge portion, the mounting portion being clamped to the rigid member.

Such a head/arm assembly is inherently stronger and less prone to damage than other forms of head/support assembly not including the rigid arm. However, other forms of assembly according to the invention are possible. For example, the head lead locating means and frame could be connected to a flexure only by a head lead tube, rather than being connected to an intermediate rigid arm.

It is preferable however for the flexure to be a metal leaf formed into a clamp for clamping the mounting portion of the head lead locating means against a relatively rigid member. The same technique can also be used to clamp head lead tubes in place.

The relatively rigid member may be an arm, a plate, or any suitable shape for mounting the flexures.

The invention also provides a data access mechanism for a disk file comprising at least one such magnetic head/support assembly, a movable carriage on which said assembly is mounted for movement relative to the disks, a rigid circuit support member, also mounted on the carriage, which supports data channel circuit components and a conductor pattern to which said components are mounted and connected, the frame of the head lead locating means of said at least one magnetic head/support assembly being registered with a corresponding portion of the circuit support member and the connection portions of the head leads being electrically connected to corresponding portions of the conductor pattern.

Both the circuit support member and the frame of the magnetic head/support assembly have corresponding registration features for ensuring alignment of the head leads and conductor pattern. Preferably, there are apertures in the circuit support member and projections on the support assembly.

Finally, the invention is equally applicable to cases in which the circuit support member is a conventional printed circuit board bearing a conductor pattern and cases in which it is a purely mechanical support for a flexible circuit.

BRIEF DESCRIPTION OF THE DRAWING

The invention will now be further described with reference to the accompanying drawings, in which:

FIG. 6 is a perspective view of part of a data access mechanism according to the invention employing a second type of head/support assembly according to the invention;

FIG. 7 is a perspective view of the underside of part of a head lead slip employed in the head/support assembly shown in FIG. 6;

FIG. 8 is a perspective view of the top side of a third type of head lead clip which may be employed in a head/support assembly according to the invention; and FIG. 9 is a perspective view of the underside of the clip of FIG. 8 with the head leads in place.

DETAILED DESCRIPTION OF THE INVENTION

Figure 1:
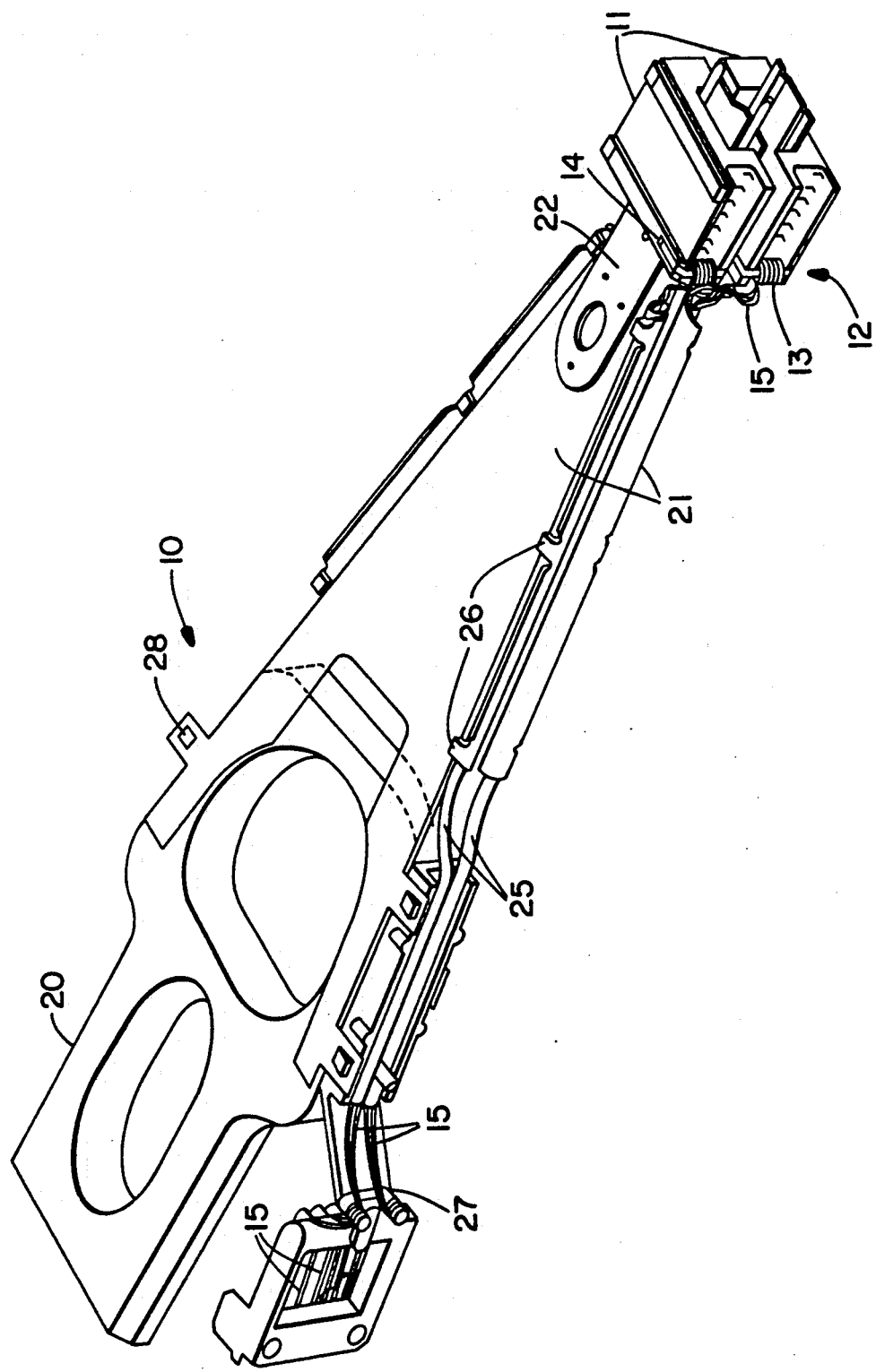
FIG. 1 is a perspective view of a head/support assembly according to the present invention.

Referring to FIG. 1, there is shown a head/arm assembly 10 for incorporation in the data access mechanism of a disk file. The assembly includes a rigid arm 20 which is adapted to plug into a movable carriage of an actuator of the voice coil motor type. A typical voice coil motor for such a disk file application is illustrated in U.S. Pat. No. 4,661,729. The arm 20 carries a pair of flexures 21 for supporting respective sliders 11. Each slider carries a magnetic head element 12 for transducing information magnetically recorded on a disk. Each head element consists of a coil 13 wound round a magnetic core 14. Fine leads 15 from the coil carry signals to or from the head element. The flexures 21 support the sliders 11 adjacent the surface of a disk while providing the required resilience to permit the sliders to fly over the disk surface. The single arm 20 carries two such flexures 21 and sliders 11 and the head/arm assembly passes between two disks so that one head accesses the upper surface of an underlying disk while the other head accesses the lower surface of an overlying disk. Each slider 11 is mounted to its respective flexure 21 by a junction plate 22, onto which the slider is directly mounted.

The fine electrical leads 15 from each head pass inside a fine tube 25 running along the length of the suspension. These leads are each approximately 0.05 mm in diameter and each head has two separate signal leads plus two earth leads, the earth leads being twisted together so that effectively, each head has three leads. The tubes 25 are retained to the flexures 21 by fingers 26, formed from the suspension material, which bend around the tubes.

To provide location for the head leads 15 when they emerge from tubes 25, a head lead clip 27 is provided. The head lead clip 27 is retained against the arm 20 by tangs on the clip which snap into corresponding slots in the flexures 21. One such slot (unused) can be seen at 28 in FIG. 1. As the head leads 15 emerge from tubes 25, they are wrapped around strain relief features on clip 27, led through guide slots to separate them, across a window and through further slots which retain them so that they are stretched taut across the window in spaced apart parallel relationship.

Figure 2:
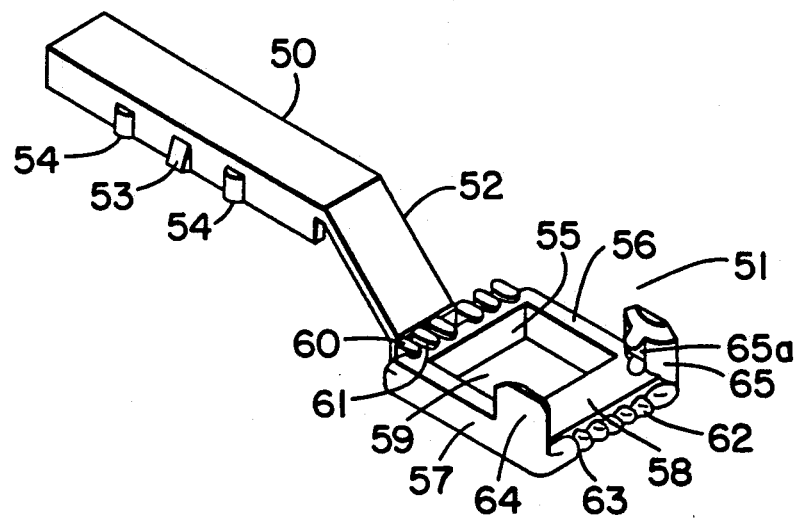
FIG. 2 is a perspective view of the underside of a head lead clip employed in the head/support assembly of FIG. 1.

FIG. 2 shows the underside of the head lead clip 27. The clip consists of a mounting portion 50 and a lead termination frame 51, separated by an elongate hinge portion 52. The mounting portion includes tangs 53 which locate in slots 28 in the suspension. One such tang is present on the side visible in FIG. 2, with two similar tangs being present on the opposite side. Also shown are projections 54 which assist in aligning tangs 53 with slots 28. The hinge portion 52 is relatively thin such that, during assembly the two other sections may hinge relative to one another.

The frame 51 is made up of end piece 55, side pieces 56, 57 and end piece 58 which define a window 59. On one side of end piece 55 are projections 60 with guide slots 61 between adjacent projections to form a comb structure, over and into which the head leads are threaded. A further comb structure is formed on the reverse side of end 58 by projections 62, forming guide slots 63. The head leads are threaded through the slots 61, pulled taut across window 59 and then retained by the slots 61 which are more deeply notched than slots 62. The loose ends of head leads 15 are cut off short as they emerge from slots 63 (see also FIG. 4). Also visible in FIG. 2, are two latching posts 64, 65. As shown in more detail in FIGS. 4 and 5, these latching posts locate in holes in a rigid circuit support such that pips 64a, 65a releasably retain the clip to the circuit support.

Figure 3:
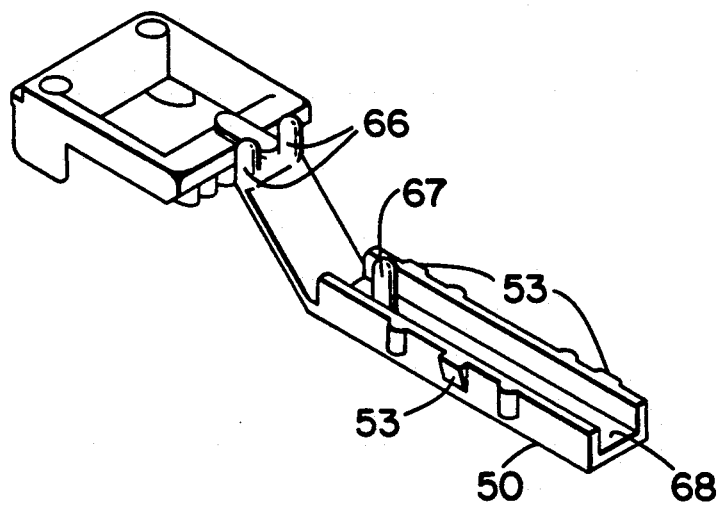
FIG. 3 is a perspective view of top side of the head lead clip of FIG. 2.

FIG. 3 shows the clip of FIG. 2 from the top side on which can be seen strain relief posts 66, around which the head leads are twisted prior to being passed through slots 61, 63. Also visible is a peg 67 which serves to separate head lead tubes 25 (not shown) which lie in a channel 68 of the mounting portion 50. The peg 67 is so dimensioned as to pinch each head lead tube and thus retain it against the adjacent side walls of channel 68. After assembly, the head lead tubes terminate approximately level with the end of the side walls.

Figure 4:
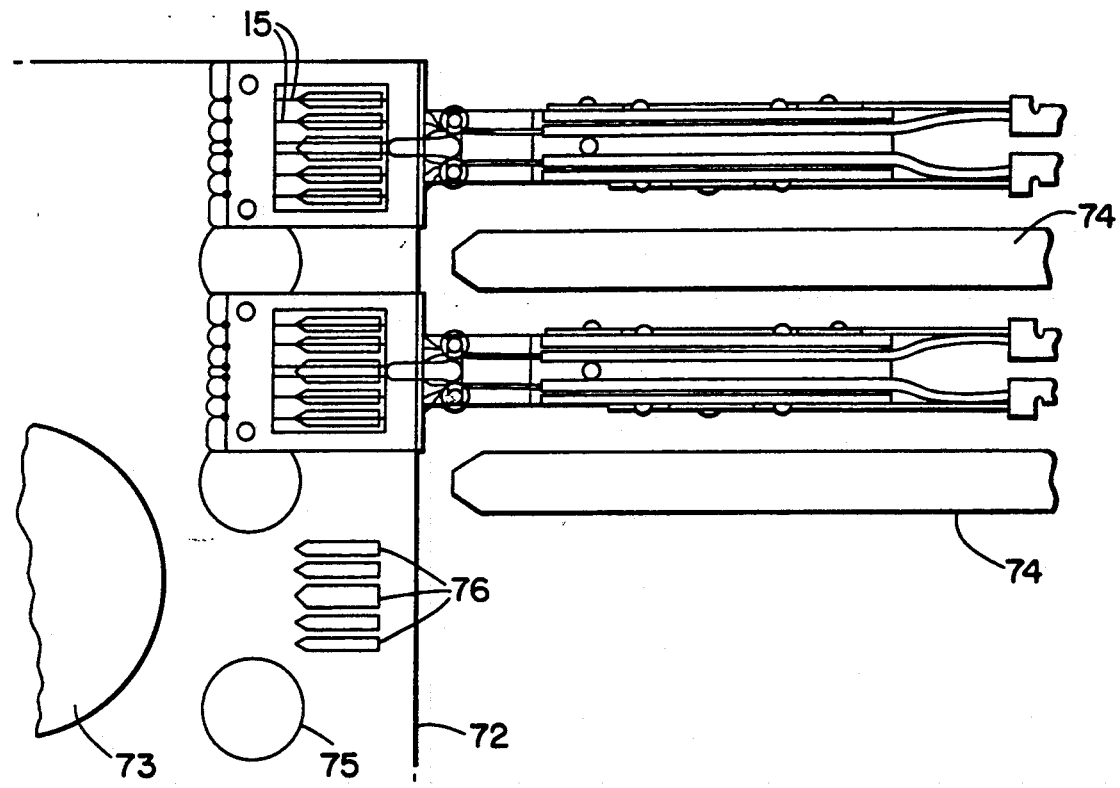
FIG. 4 is a side elevation of part of a data access mechanism for a disk file according to the invention showing a circuit support member on which two of the head/support assemblies of FIG. 1 are mounted.
Figure 5:
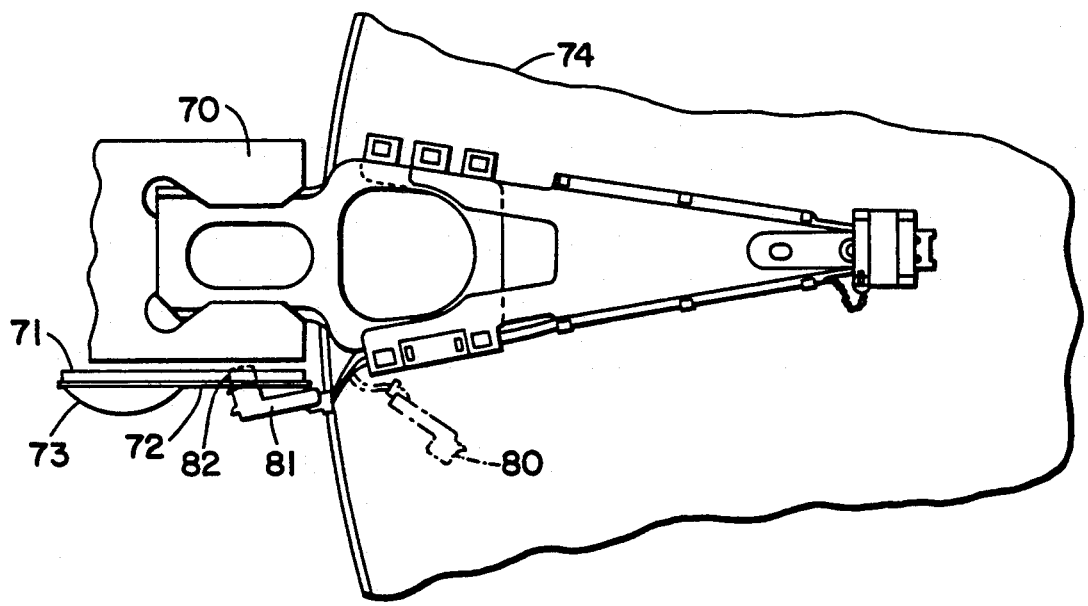
FIG. 5 is a plan view of the data access mechanism partly illustrated in FIG. 4.

FIGS. 4 and 5 show two of the head/support assemblies illustrated in FIG. 1, in place in a disk file and connected to data channel circuitry mounted on the data access mechanism of the file. All that is visible (FIG. 5) of the access mechanism, which may be of the voice coil motor type, is a portion 70 of the moving carriage of the mechanism in which the arms 20 are located. Also part of and movable with the access mechanism is a rigid circuit support 71, for a flexible circuit 72. A data channel circuit chip 73 for pre-amplifying the signals from head elements 12 and for selecting head elements for reading or writing is surface mounted and encapsulated on the flexible circuit 72. Also visible in FIGS. 4 and 5 are two of the disks 74 of the disk file.

The flexible circuit 72 has a line of hole 75 in which the posts 64 and 65 of clips 27 locate and are retained by pips 64a and 65a. These holes are accurately positioned with respect to groups of contact pads 76 on the flexible circuit 72 to which the head leads 15 are to be soldered. Each group of contact pads comprises five pads, providing the electrical connections required for two heads (one head/arm assembly). The four earth connections (one twisted pair from each head) all connect to the center pad. The arrangement of the pads corresponds to the positions of the leads 15 crossing the window 59 in the head lead clip, so that each wire is registered with and overlies its respective contact pad.

Electrical connection of the contact pads to the head leads is achieved by soldering through the clip window. The soldering technique used may be reflow soldering, wave soldering, or probe soldering. All leads within one clip window are soldered in a single soldering operation. Subsequently to the soldering operations, it is possible for the solder junctions to be encapsulated with a protective layer, the clip window forming a dam for the encapsulant.

FIG. 5 better illustrates the stages of assembly of the clip to the data channel circuitry. During assembly of the head/arm assembly to the voice coil motor, the termination frame 51 of the clip is pulled back to position 80 to avoid fouling the flexible circuit and is subsequently moved through slack position 81 to the assembled position 82 in which the latching posts 64 and 65 locate in and engage the circuit support 71.

FIG. 6 shows an alternative form of head/support assembly and clip, three of which are mounted on a circuit board 90 forming part of the access mechanism of a disk file. The arrangement does not differ in principle from that of FIGS. 1 to 5. However, the head lead clip 91 together with the head lead tubes 92 are both trapped under extended lugs 93 from the suspension at the side of the head arm. The tubes are located either side of the central wall on the "T" section mounting portion 94.

The head leads 95 exit from the tubes and pass once round an anvil 96 at the hinge point to form a strain relief and are then separated to enter a "comb" on a window frame portion 97. The twisted center taps pass side by side through the center slot. All leads then pass through the window, through guides under the rear window frame and up through the retaining slots on the rear face. This causes the leads to lie across the underside of the window parallel to each other. It may be necessary to lock the leads in the slots with a dab of adhesive. Head test can be carried out by making contact to the excess lead beyond the frame molding before trimming to length.

On assembly, the head bar assembly is pushed into its location in the access mechanism with the window frame clear of the circuit board 90. After clamping the heads, the window frame is hinged down to locate semicircular pegs 98, into holes in the circuit board. These are accurately positioned relative to copper lands 99 and are under size thus positioning the leads over respective lands and retaining the clip in place.

An automated step and repeat reflow soldering process can now be used for termination and corrosion inhibitor/adhesive application within the window frame.

FIG. 7 shows the reverse side of the clip 91 showing more detail of the retention pegs 98 and of the guide slots. It will be noted that the guide slots are located in the upper surface of the clip on the edge of the frame nearest to the heads but on the lower surface of the frame edge remote from the heads.

FIGS. 8 and 9 show yet another version of head lead clip which is useful in cases where the circuit board connections pads cannot be located immediately adjacent the head/support elements to which they are to be connected. In this case, as shown in FIG. 9, an extended head lead tube 100 is provided to carry extended head leads 101 from the suspension (not shown) to a head lead clip 102. The combination of head, suspension, lead tube 100, leads 101 and clip 102 is still a head/support assembly according to the invention, even though the clip 102 is only supported by the head lead tube and is not directly connected to a suspension or arm.

The lead tube 100 may be retained in a channel portion 103 of the clip by adhesive. This retention provides strain relief for the head leads 101, which emerge from the tube and are guided, similarly to the previously described clips, through comb structures 104 and 105 and across an open frame 106. The leads are retained by notching of the comb structure 105. Retention pegs 107, similar to posts 64, 65 in FIG. 5 locate and retain the clip in a circuit board (not shown).

What is claimed is:

1. A magnetic head support assembly comprising
at least one magnetic head element for reading information from and writing information on a magnetic record disk of a magnetic disk file;
support means mounted in such disk file for supporting said magnetic head element in transducing relationship with the magnetic record disk;
a plurality of electrical connector, head leads for carrying information signals to or from said magnetic head element; and
head lead locating means for locating the head leads remotely from the element and at which the head leads are terminated for electrical connection to external circuitry,
said head lead locating means including a frame attached to said support means across which the leads extend and are retained in fixed relationship over a sufficient portion of their lengths to permit direct electrical connection of said portions to a correspondingly spaced pattern of conductors of said external circuitry,
said support means including a relatively rigid member, a flexure rigidly mounted on said member and a slider mounted on the flexure at the end remote from said member, the magnetic head element being mounted on said slider, the head lead locating means comprising a mounting portion connected to the frame by a hinge portion clamped to said member, and
said flexure comprises a metal leaf that also forms a clamp for clamping said mounting portion to said member.

2. A magnetic head/support assembly as in claim 1 wherein said head leads pass through a head lead tube and said clamp also serves to clamp said head lead tube to said mounting portion.

3. A magnetic head/support assembly as in claim 2 wherein said frame is formed with latching posts which are received in complimentarily shaped apertures of a rigid circuit support for said external circuitry.

4. A magnetic head/support assembly as in claim 3 wherein said head element, slider and flexure share a common rigid member with a second head element, slider and flexure, said frame also being common to the head leads from both said head elements.

5. A data access mechanism for a disk file comprising
at least one magnetic head/support assembly as in claim 4, and
a movable carriage on which said assembly is mounted for movement relative to the disks,
said rigid circuit support member also being mounted on said carriage and supporting data channel circuit components and a conductor pattern to which said components are mounted and connected,
said frame and head locating means of said at least one head/support assembly being registered with a corresponding portion of said circuit support member and the connection portions of said head leads being electrically connected to corresponding portions of the conductor pattern.

6. A data access mechanism as claimed in claim 5 wherein said circuit support member is provided with registration apertures and the frame of the magnetic head/support assembly has corresponding latching posts for engaging said registration apertures.

7. A magnetic head/support assembly comprising:
at least one magnetic head element for reading information from and writing information on a magnetic record disk of a magnetic disk file;
support means mounted in such disk file for supporting said magnetic head element in transducing relationship with the magnetic record disk;
a plurality of electrical connector leads for carrying information signals to or from said magnetic head element; and
lead locating means for locating leads remotely from the had element and at which the leads are terminated for electrical connection to a spaced pattern of conductors of external circuitry, said lead locating means including a frame having at least one opening therein, said frame attached to said support means, each of said leads having a connection portion spanning an opening and retained in fixed spaced relationship from the other leads to permit direct electrical connection of each of said connection portions to the correspondingly spaced pattern of conductors of said external circuitry.

8. A magnetic head/support assembly as claimed in claim 1 in which the opening exposes each connection portion of said leads from two opposed directions.

9. A magnetic head/support assembly as in claim 1 in which said frame is substantially rectangular with a single opening across which said connection portions extend, two opposite edges of said frame each having a plurality of guide slots for guiding respective leads.

10. A magnetic head/support assembly as in claim 9 in which the ends of the leads are trapped and retained by said guide slots on one edge of said frame, said guide slots on the opposite edge serving merely to guide the leads, the frame including a strain relief post adjacent said opposite edge around which the leads are wound to maintain tension.

11. A magnetic head/support assembly as in claim 9 in which said support means comprises a relatively rigid member, a flexure fixedly mounted on said member and a slider mounted on the flexure at an end remote from said member, the magnetic head element being mounted on said slider, the lead locating means comprising a mounting portion connected to the frame by a hinge portion being clamped to said member.

12. A magnetic head/support assembly as in claim 11 wherein the frame is formed with latching posts for locating in complimentarily shaped apertures of a rigid circuit support member for such external circuitry.

13. A magnetic head/support assembly as in claim 12 wherein said head element, slider and flexure share said support means with a second head element, slider and flexure, said frame also being common to the leads from both head elements.

14. A data access mechanism for a disk file comprising
at least one magnetic head/support assembly as in claim 7, and a movable carriage on which said assembly is mounted for movement relative to the disks, said rigid circuit support member also being mounted on said carriage and supporting data channel circuit components and a conductor pattern to which said components are mounted and connected, said frame and lead locating means of said at least one head/support assembly being registered with a corresponding portion of said rigid circuit support member and the connection portions of said leads being electrically connected to corresponding portions of the spaced pattern of conductors of said external circuitry.

15. A data access mechanism as in claim 14 wherein said rigid circuit support member is provided with registration pertures and the frame of the magnetic head/support assembly has corresponding latching posts for engaging said registration apertures.

* * * * *

UNITED STATES PATENT AND TRADEMARK OFFICE
CERTIFICATE OF CORRECTION

PATENT NO. : 5,012,368

DATED : April 30, 1991

INVENTOR(S) : Maurice H. Bosier and Gerald Dixon

It is certified that error appears in the above-identified patent and that said Letters Patent is hereby corrected as shown below:

Column 8, line 21, "had" should be --head--

Column 8, line 34, "1" should be --7--

Column 8, line 36, "1" should be --7--

Column 8, line 68, "7" should be --13--

Signed and Sealed this

Seventeenth Day of November, 1992

Attest:

DOUGLAS B. COMER

Attesting Officer

Acting Commissioner of Patents and Trademarks